Sept. 15, 1931. F. L. MORSE 1,823,696
CHAIN DRIVE
Filed Sept. 13, 1928
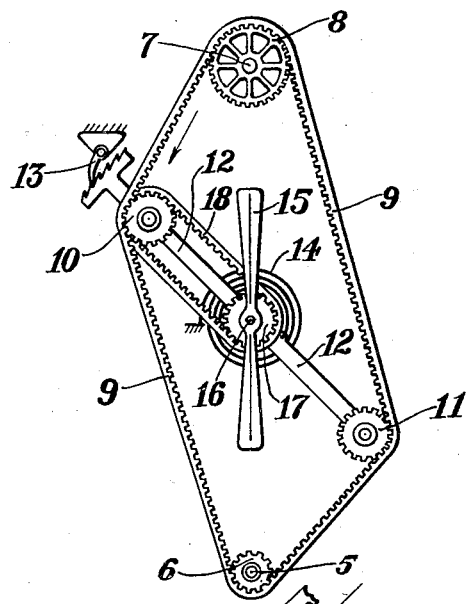
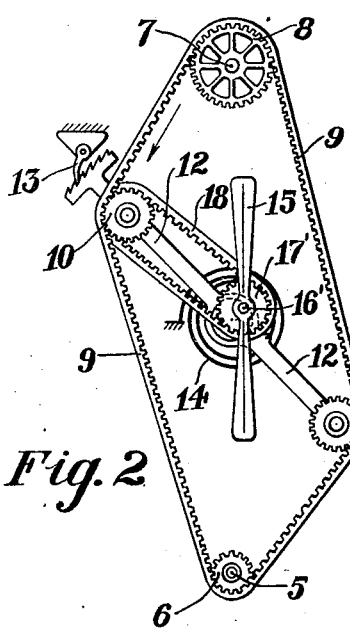
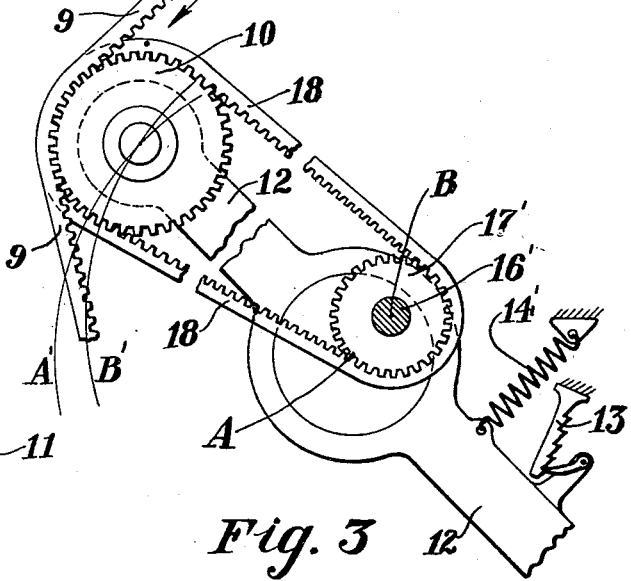
FRANK L. MORSE INVENTOR.
BY Robert V. Morse
ATTORNEY.

Patented Sept. 15, 1931

1,823,696

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

CHAIN DRIVE

Application filed September 13, 1928. Serial No. 305,820.

This invention relates to chain drives and tighteners, and particularly to installations where an accurate timing or angular relation is desired between the driving and the driven shafts, as for example the cam shaft drives of internal combustion engines. This application is a continuation in part of my application No. 300,887, filed Aug. 20, 1928. In many such engines having an overhead cam shaft the chain drive connecting to the crank shaft is vertical, and some form of tightener is generally necessary to keep the chain in running engagement with the lower sprocket wheel on the crank shaft. Where the center distances are long, and a tightener is used on the slack side of the chain only, the gradual lengthening of the tight or driving side of the chain drive due to wear introduces an error in the timing which may become serious.

Such installations also often require a chain drive to a fan, which necessitates another tightener if it is to be kept under the proper tension.

The object of the present invention is to provide a chain drive and tightener mechanism which will overcome some of these difficulties in a simple and effective manner. The invention is of course applicable to various other mechanisms other than cam shaft drives, wherever the same or similar problems arise.

Referring now to the drawings, Fig. 1 is a front elevation of the chain drive as applied to a cam shaft mechanism.

Fig. 2 is a similar view of a modified form including an automatic tensioner on the fan drive.

Fig. 3 is a fragmentary view showing in greater detail the eccentric mechanism of Fig. 2.

Taking up first the cam shaft drive shown in Fig. 1, the crank shaft is indicated by the reference numeral 5, on which is mounted a driving sprocket 6, and the cam shaft is indicated by the reference numeral 7 and is driven by the sprocket wheel 8, which is usually twice the diameter of the sprocket wheel 6.

The sprocket wheel 8 is connected to the sprocket wheel 6 by a chain 9 conventially shown, which may be of any suitable type. This chain also runs over two idler sprockets 10 and 11 mounted on a pivoted arm 12. The arm 12 is not at right angles to the center line connecting the sprockets 6 and 8, consequently when the arm 12 is turned counter-clockwise for example by any suitable means such as the spiral spring 14 it will take up any slack in the chain 9. A ratchet mechanism 13 conventionally shown,—which may be of any suitable type,—may be used as a take up to hold the arm in the tightening position. If only one idler sprocket were used, the stretch of the chain due to wear would affect the timing, by allowing the driving sprocket to turn ahead an appreciable amount without turning the driven sprocket correspondingly; but by the use of two idler sprockets on opposite strands of the chain this error is eliminated, since the stretch is taken up as much on one side as on the other and the turning of the sprockets is not affected.

While I have shown a spiral spring 14 in the drawings, it will be understood that any other form of torque device, spring, weight or pressure means might be used. In Fig. 3 for example I have indicated a tension spring 14'. It will also be noted that the drag on the idler sprockets 10 and 11 due to the running of the chain itself will tend to move them into a tensioning position. Of course, if desirable in certain installations, the arm 12 might be inclined the other way so that the running of the chain would tend to loosen the chain on the idlers 10 and 11, and yet the device would function provided the spring or other torque means 14 were sufficiently powerful to overcome the drag of the running chain.

Where it is desired to drive a fan by a chain, as in some automobiles for example, the fan 15 may be mounted concentric with the supporting shaft 16 on which the arm 12 is pivoted, as shown in Fig. 1. The fan 15 is connected to the sprocket 17 which is driven from the idler sprocket 10 by means of the chain 18. When the fan sprocket 17 is mounted concentrically with the pivot of the arm 12, the tension of the fan drive chain 18 is not affected by any change in the position of the arm 12, and tensioning the chain 9 does not affect the chain 18.

In some installations it may be desirable to tension the fan drive chain 18 automatically as well as the chain 9, and one means for doing this is shown in Fig. 2 and Fig. 3, in which the fan sprocket 17' is mounted eccentrically on the pivotal support 16' of the arm 12. As shown more specifically in Fig. 3, the motion of the idler sprocket 10 about the pivotal center A of the arm 12 will be on the arc A', while the arc B' is drawn on the center B of the fan sprocket 17'. A movement of the arm 12 in a counter-clockwise direction, or as indicated by the arrow, will obviously tend to increase the tension of the fan chain 18 at the same time it tightens the main chain 9. Thus the same mechanism will operate to tighten the entire system.

While I have in the foregoing described the invention in certain preferred embodiments, it will be understood that these are merely by way of illustration, and that the invention is susceptible to various modifications and adaptations in different installations as will be apparent to those skilled in the art without departing from the scope of the invention as set forth in the following claims.

I claim:

1. In a chain drive, the combination of a driving sprocket, a driven sprocket, a chain connecting the driving and driven sprockets, a pivoted arm mounted diagonally between the two strands of the chain, tightener wheels mounted on opposite ends of the arm and engaging opposite strands of the chain, means to actuate said arm to tighten the chain, and a second chain drive driven from one of the tightener wheels and extending along the arm and adapted to swing with it.

2. In a chain drive, the combination of a driving sprocket, a driven sprocket, a chain connecting the driving and the driven sprockets, a pivoted arm mounted diagonally between the two strands of the chain, tightener wheels mounted on opposite ends of the arm engaging opposite strands of the chain, means to actuate said arm to tighten the chain, a second chain drive driven from one of the tightener wheels and extending along the arm and adapted to swing with it, and means for tightening said second chain drive.

3. In a chain drive, the combination of a driving sprocket, a driven sprocket, a chain connecting the driving and driven sprockets, a pivoted arm mounted diagonally between the two strands of the chain, tightener wheels mounted on opposite ends of the arm and engaging opposite strands of the chain, means to actuate said arm to tighten the chain, a second chain drive driven from one of the tightener wheels and extending along the arm and adapted to swing with it, said second drive including a central wheel mounted eccentrically to the arm pivot, whereby both drives may be tightened simultaneously.

4. In a chain drive, the combination of a driving sprocket, a driven sprocket, a chain connecting the driving and driven sprockets, a pivoted arm mounted diagonally between the two strands of the chain, tightener wheels mounted on opposite ends of the arm and engaging opposite strands of the chain, means to actuate said arm to tighten the chain, take-up means for retaining the arm in the tightened position, and a second chain drive driven from one of the tightener wheels and extending along the arm and adapted to swing with it.

5. In a chain drive, the combination of a driving sprocket and a driven sprocket, a chain connecting the driving and driven sprockets, a pivoted arm mounted diagonally between the two strands of the chain, tightener wheels mounted on opposite ends of the arm engaging opposite strands of the chain, means to actuate said arm to tighten the chain, take-up means for retaining the arm in the tightened position, a second chain drive extending along the arm, and eccentric means for tightening said second chain drive.

In testimony whereof I have hereunto signed my name this 4th day of September, 1928.

FRANK L. MORSE.